United States Patent [19]
Finucane et al.

[11] Patent Number: 5,095,505
[45] Date of Patent: Mar. 10, 1992

[54] EFFICIENT FLEXIBLE SPECIAL SERVICE CALL PROCESSING

[75] Inventors: James J. Finucane, Chevy Chase, Md.; David Weimer, Falls Church, Va.

[73] Assignee: MCI Communications Corp., Washington, D.C.

[21] Appl. No.: 704,715

[22] Filed: May 17, 1991

Related U.S. Application Data

[63] Continuation of Ser. No. 485,308, Feb. 28, 1990, abandoned.

[51] Int. Cl.⁵ .................. H04M 3/42; H04M 15/00
[52] U.S. Cl. .................................. 379/201; 379/207; 379/219; 379/127
[58] Field of Search ............... 379/127, 201, 219, 220, 379/112, 210, 211, 212, 207, 88

[56] References Cited

U.S. PATENT DOCUMENTS

| | | | |
|---|---|---|---|
| 4,191,860 | 3/1980 | Weber | 379/211 X |
| 4,757,267 | 7/1988 | Riskin | 379/201 X |
| 4,924,510 | 5/1990 | Le | 379/201 X |

OTHER PUBLICATIONS

Andrews, Jr. Frederick, "Switching in a Network of Networks—Part 1 and 2, Telephony" May 28, 1984, pp. 43-50 and Telephony Jun. 4, 1984, pp. 58-66.

Network Communications—Applications and Services, AT&T Communications, "AT&T 800 Service", pp. 3-26, 1984.

*Primary Examiner*—James L. Dwyer
*Assistant Examiner*—Ahmad F. Matar
*Attorney, Agent, or Firm*—Pollock, Vande Sande & Priddy

[57] ABSTRACT

Special service call processing, such as 800 processing, is improved in accordance with the present invention. A data base includes a customer subscription record segment which stores call processing data keyed at least in part on a dialed 800 number. The subscription record for a customer is hierarchical in that it includes a head entry (for customers using basic or immediate service). The head entry for customers using advanced service, when accessed, produces Originating Area ID identification (OAID). Subsequent accesses to the data base use the OAID in order to access additional records for chronological time processing. Those additional records may include time band or day band arrays. Accessing a day band array will produce a Day Band ID identification (DBID). The DBID can be used on a subsequent access to identify a time band array. In some embodiments, the head entry may include a plan identification. Extraction of a non-zero plan identification allows accessing alternative records providing for additional flexibility. In one embodiment, either the head entry (for customers using immediate or basic service) or the access to the data base using the OAID, DBID and TBID directly produce termination data. In other embodiments, the head entry (for customers using immediate or basic service) or the entry accessed by the OAID, DBID and TBID produce a termination pointer. One final access to the data base, in this embodiment, using the termination pointer, produces the termination data. The invention also provides for holiday processing allowing the data base to be rewritten, at the appropriate time, to take into account data variations caused by holidays.

29 Claims, 12 Drawing Sheets

FIG. 3

HEAD ENTRY FOR ENHANCED SERVICE

KEY: 800#

| DATA STORED | COMMENT | | |
|---|---|---|---|
| 800 SERVICE FLAG | 1 BYTE | RANGE | [0-5] |
| GEOGRAPHIC BAND SECTION | | | |
| ORIGINATING AREA TYPE | 1 BYTE | RANGE | [0-6] |
| # OF ORIGINATING AREAS | 2 BYTES | RANGE | [0-450] |
| ORIGINATING AREA $ID_1$ | | | |
| ORIGINATING AREA $ID_2$ | | | |
| . | | | |
| . | | | |
| ORIGINATING AREA $ID_N$ | | | |
| PLAIN NUMBER | | | |

FIG. 4

ENTRY FOR DAY BAND PROCESSING

KEY: 800, OAID

| STORED DATA | COMMENT | | |
|---|---|---|---|
| DAY BAND ARRAY | 7 ELEMENTS | | |
| DAY BAND $ID_1$ | 1 BYTE | RANGE | [1-7] |
| DAY BAND $ID_2$ | | | |
| . | | | |
| . | | | |
| DAY BAND $ID_7$ | | | |

FIG. 5

ENTRY FOR TIME BAND PROCESSING

KEY: 800#, OAID, DBID or,
800#, OAID

| DATA STORED | COMMENT | | |
|---|---|---|---|
| TIME BAND ARRAY | | | |
| NUMBER OF TIME BAND ARRAYS | 1 BYTE | RANGE | [1-48] |
| STOP TIME | 2 BYTES | RANGE | [1-2400] |
| TIME BAND $ID_1$ | 1 BYTE | RANGE | [1-48] |
| STOP TIME | | | |
| TIME BAND $ID_2$ | | | |
| . | | | |
| . | | | |
| STOP TIME | | | |
| TIME BAND $ID_N$ | | | |

NOTE 1: ADDRESSED VIA 800 # (OR MODIFIED 800 #) + OAID
NOTE 2: ADDRESSED VIA 800 # (OR MODIFIED 800 #) + OAID + DBID
NOTE 3: ADDRESSED VIA 800 # (OR MODIFIED 800 #) + OAID + DBID + TBID

BASIC SERVICE DATA FLOW

| FUNCTION | DATA | RESULT |
|---|---|---|
| F1 | REGION INFO CODED AS FG-D FG-C | CORRESPONDING REGION SUBSCRIPTS FOR NPA LATA LATA/NPA=OGA STATE TIME ZONE |
| F3 | 800# | SERVICE CODE AND TERMINATION DATA |
| F4 | SERVICE CODE | SELECT PROCESSING F 5 |
| F5, 6 | TERMINATION DATA | TERMINATION MESSAGE |

FIG. 11

ENHANCED SERVICE WITH FULL CHRONOLOGICAL

| FUNCTION | DATA | RESULT |
|---|---|---|
| F1 | REGION INFO CODED AS<br>FG-D<br>FG-C | CORRESPONDING REGION SUBSCRIPTS FOR<br>NPA<br>LATA<br>LATA/NPA=OGA<br>STATE<br>TIME ZONE |
| F3 | 800# | SERVICE CODE AND ORIGINATING TYPE AND ORIGINATING AREA ARRAY |
| F4 | SERVICE CODE | SELECT PROCESSING F7 |
| F7 | ORIGINATING AREA TYPE | SELECT SUBSCRIPT |
| F7 | SELECTED SUBSCRIPT AND ORIGINATING AREA ARRAY | OAID |
| F8 | 800# AND OAID | DAY BAND ARRAY |
| F12 | CURRENT CHRONOLOGICAL | DAY OF WEEK |
| F13 | DAY OF WEEK AND BAND ARRAY | DBID |
| F14 | 800# AND OAID AND DBID | TIME BAND ARRAY |
| F17 | CURRENT CHRONOLOGICAL | TIME OF DAY |
| F18 | TIME OF DAY AND TIME BAND ARRAY | TBID |
| F19 | 800# AND OAID AND | TERMINATION DATA |

FIG. 12

ENHANCED SERVICE WITH FULL CHRONOLOGICAL

| FUNCTION | DATA | RESULT |
|---|---|---|
| F1 | REGION INFO CODED AS<br>   ANI<br>   OOY<br>   DAL | CORRESPONDING REGION SUBSCRIPTS FOR<br>   NPA<br>   LATA<br>   LATA/NPA = OGA<br>   STATE<br>   TIME ZONE |
| F3 | 800# | SERVICE CODE AND ORIGINATING TYPE AND ORIGINATING AREA ARRAY |
| F4 | SERVICE CODE | SELECT PROCESSING F7 |
| F7 | ORIGINATING AREA TYPE | SELECT SUBSCRIPT |
| F7 | SELECTED SUBSCRIPT | OAID |
| F8 | 800# AND OAID | TIME BAND ARRAY |
| F17 | CURRENT CHRONOLOGICAL | TIME OF DAY |
| F18 | TIME OF DAY AND TIME BAND ARRAY | TBID |
| F19 | 800# AND OAID AND TBID | TERMINATION DATA |

FIG. 13

ENHANCED SERVICE WITH FULL CHRONOLOGICAL
AND PLAN VARIATION

| FUNCTION | DATA | RESULT |
|---|---|---|
| F1 | REGION INFO<br>CODED AS<br>    ANI<br>    OOY<br>    DAL | CORRESPONDING REGION<br>SUBSCRIPTS FOR<br>    NPA<br>    LATA<br>    LATA/NPA = OGA<br>    STATE<br>    TIME ZONE |
| F3 | 800# | SERVICE CODE AND<br>ORIGINATING TYPE AND<br>ORIGINATING AREA<br>ARRAY |
| F4 | SERVICE CODE | SELECT PROCESSING F7 |
| F7 | ORIGINATING AREA TYPE | SELECT SUBSCRIPT |
| F7 | SELECTED SUBSCRIPT<br>AND ORIGINATING AREA<br>ARRAY AND PLAN NUMBER | OAID AND PLAN NUMBER |
| F8 | MODIFIED 800# AND OAID | DAY BAND ARRAY |
| F12 | CURRENT CHRONOLOGICAL | DAY OF WEEK |
| F13 | DAY OF WEEK AND<br>DBID | DBID |
| F14 | MODIFIED 800# AND OAID<br>AND DBID | TIME BAND ARRAY |
| F17 | CURRENT CHRONOLOGICAL | TIME OF DAY |
| F18 | TIME OF DAY AND TIME<br>BAND ARRAY | TBID |
| F19 | MODIFIED 800# AND OAID<br>DBID AND TBID | TERMINATION DATA |

EFFICIENT FLEXIBLE SPECIAL SERVICE CALL PROCESSING

This is a continuation of copending application Ser. No. 485,308, filed on Feb. 28, 1990, now abandoned.

DESCRIPTION

1. Technical Field

The present invention relates to special service telephone call processing such as "800" and "900" call processing.

2. Background Art

One example of special service calling is INWATS, or 800 service, which has proven to be an attractive feature for many customers. INWATS or 800 service differs from conventional telephone service in that whereas in normal telephone service the cost of a call is typically billed to the calling station, in INWATS or 800 service the cost of the call is billed to the called station. An example of the implementation of prior art 800 service is provided in U.S. Pat. 4,191,860. 800 telephone numbers are different from many other 10-digit telephone numbers in that the 800 number does not identify any telephone station. Typically, a telephone station is identified by the 10-digit DDD designation NPA-NXX-XXXX, where NPA represents the Number Plan Area, NXX represents a particular terminating exchange within the NPA, and XXXX identifies a unique telephone termination connected to the specific NXX terminating exchange within the NPA area. Since the 800 designation is not an NPA, the 800 number does not identify a particular telephone station as does a conventional 10-digit DDD number. An 800 number (and similarly a 900 number) is sometimes referred to as a dummy telephone number since the prefix (800 or 900) is not a NPA, but rather is referred to as a Service Access Code (SAC). The 800 processing described in U.S. Pat. No. 4,191,860 provides for flexible calling based on the following features. A customer (the called party) may select more than a single termination for a given 800 number. Typically the customer may have two (or more) different terminating stations, in different geographic regions. In this example, the customer would typically select telephone calls originating in areas most closely associated with a first of the terminating telephone stations to be directed to the first terminating station, whereas other telephone calls originating in geographic areas more closely associated with the second terminating station would be directed to the second terminating station. As described in U.S. Pat. No. 4,191,860, this processing is implemented by using not only the dialed 800 number, but also the originating NPA to determine where to terminate any particular 800 call. In the course of processing, both items of information are transferred to a data base which performs a table look-up to identify a particular terminating station based on these two pieces of information.

Another degree of flexibility is provided by the processing described in U.S. Pat. No. 4,191,860 by allowing the customer to identify different terminating stations based on the chronological point in time at which the call is placed. In other words the customer may designate a first terminating station to handle calls directed to the given 800 number if the call is placed between the hours of 8 AM and 5 PM (for example), whereas if the call is placed at other times, then the call is terminated at a different terminating station. This time of day differentation can be extended to (or coupled with) a day of week factor. For example, calls placed between Monday and Friday (inclusive) are terminated at a first terminating station, whereas calls placed on other days of the week are terminated at a second termination station.

While 800 calling service can be used by large and small customers, usage of the service by large organizations is relatively common. Furthermore, the market for 800 telephone service is of course nationwide and as a result the volume of processing for 800 service can be expected to be heavy. For this reason, it is desirable that processing be efficient as well as flexible. While the procedures described in U.S. Pat. No. 4,191,860 are flexible, the procedures described in that patent, from the point of view of efficiency, desirably could be improved.

Since 800 call processing information can be derived from geographically widely dispersed locations, and since the processing depends on the use of a data base, practical implementation requires tradeoffs to be made in determining the number and location of the data base or bases which are employed. Clearly, one alternative is to duplicate the data base at each switch in the telephone network which is to process 800 calls. This has the advantage of making the required information immediately available where it is needed. The size of the 800 data base renders this approach impractical. At the other extreme, a communications system is implemented, connecting each of the switches handling 800 calls to a single nationwide data base; efficiency is improved since the data base need not be duplicated. Actually, for reliability reasons, the minimum number of data bases that are practical is two, so that if one data base is out of service, the duplicate data base is available for on-line processing. A significant disadvantage of centralizing the 800 processing data base (in one or two data bases) is the multiplication of the volume of calls which must be handled as the number of data bases available for processing shrinks. Thus, as smaller numbers of data bases are employed, greater emphasis is placed on the efficiency with which the data base can implement the required processing. There is, however, a synchronization problem (which is present whenever there is more than a single data base) which grows along with the number of data bases.

Another area in which the processing described in U.S. Pat. No. 4,191,860 needs improvement is the basis used in determining the origination location of the call. The patent describes a single basis, i.e. NPA. However, it would be advantageous if the originating regions could be identified in terms of other parameters. More particularly, since the divestiture of the local operating companies from the parent American Telephone & Telegraph Company, so-called Local Access Transport Areas (LATA) have been created. Thus another basis for differentiating the origination area of a call is LATA. Furthermore, since LATAs and NPAs exist independently of each other, another basis for differentiating area of origination is the intersection of NPAs and LATAs (hereinafter Originating Geographic Area or OGA). Since there are 160 NPAs and 123 LATAs, there are approximately 450 intersections of LATAs and NPAs, which provides a finer basis of determining area of call origination. There are still other potential bases for differentiating area of origination, such as political jurisdiction (i.e. states), postal zip codes or one of the time zones. Unfortunately, it is not possible to precisely define some points of origin, relative to time zones or LATAs using only NPA data.

In order to implement practical special service call processing system, the implementation must take into account a number of complicating factors. Special service calls can be received, at the switch of an interexchange carrier, from the Public Switched Network (PSN) in at least two different forms. In one case, calls are received from a local telephone company switching system which has been modified for equal access (sometimes referred to as Feature Group D); in this case, the interexchange carrier switch will receive, in addition to the user-dialed number, Automatic Number Identification (ANI) information which will include at least the originating NPA. Typically, ANI also includes the billing number associated with the call (the NXX-XXXX designation). On the other hand, for local telephone company switches which have not been modified for equal access (so-called Feature Group C), the interexchange carrier switch may receive, in addition to the user-dialed number, a so-called OOY code. Accordingly, the data base must be configured to properly process such a call regardless of whether it is received with ANI or OOY code or merely the user-dialed number.

Where flexibility is important, and the customer may be allowed to choose his point of origination type from a number of different types (e.g. NPA, LATA, OGA, state identification, or time zone), the data base must be prepared to translate the information which is received (FG-D or FG-C) into the required parameters.

In connection with data storage efficiency and processing speed the arrangement disclosed in U.S. Pat. No. 4,191,860 leaves room for improvement. The patent describes a data base which has two tables for each customer. A first table (FIG. 2) has, for each NPA, either a 10 digit telephone number or a null entry. A second table (FIG. 3) has an entry for each telephone number in the first table which either designates an alternate telephone number or no alternate telephone number. Processing always consults both tables, the first to extract a telephone number and the second to determine if an alternate number should be used. This is wasteful of both storage space and processing speed especially for customers who do not use many NPA's or who do not use alternate telephone numbers.

SUMMARY OF THE INVENTION

In contrast, the present invention breaks down a customer record on a functional or hierarchical basis. Each customer record has a head entry, which is the first customer entry which is consulted. However, the head entry comes in several different varieties.

The head entry for a customer using basic or immediate service (where there is little or no variation on the destination telephone number) can immediately generate the destination telephone number with this single access, saving storage space and processing time.

The remaining entries for each customer form a chain which need be only so long as is necessary to account for the destination variations required by the customer. For example, when point of call routing or tailored call coverage is desired, destination variations have a head entry which produces an Originating Area IDentification (OAID) when the head entry is consulted along with the appropriate index (generation of this index will be described later). A further access to the data base, using the OAID, can produce the destination telephone number.

Only customers who actually use chronological destination differentiation have entries in the data base to make the appropriate selection, saving storage space as well as the processing time required to consult these further entries.

More particularly, with the present invention flexibility is maintained by using separate data base entries for the different degrees of flexibility. In other words each subscriber (i.e. customer) has a head entry accessed by use of an 800 number. The head entry identifies the type of service which also identifies the data appearing in the entry and format of the entry. As a result, the appropriate form of processing which is required is defined. Entries have one of two general formats, either the entry is immediate or the entry is an intermediate entry which allows extraction of additional key information needed to identify the appropriate immediate entry. In one embodiment, an immediate entry allows direct extraction of the terminating information. I another embodiment, the immediate entry produces a pointer which is used for direct extraction of the terminating information. Subscribers using basic service have a head entry which is an immediate entry. In other words, access to the head entry will result (in one embodiment) in the direct extraction of the desired termination data. On the other hand subscribers using any form of enhanced service have a head entry of intermediate form.

For example, subscribers who use point of origin differentiation use a head entry with an array including an element for each different region of origin (regardless of the criterion used to differentiate the different regions). Each element has an Originating Area IDentification (OAID). One OAID is extracted on accessing the entry, based on the region information received with the dialed 800 number. The OAID is then used, along with the 800 number as a key into the data base to extract further information. The entry pointed to by the combined key (800 number and OAID) may be either an immediate or an intermediate entry depending on the service selected by the subscriber. For subscribers who do not use chronological (time or day based) differentiation, the entry pointed to is an immediate entry. For other subscribers the entry is a further intermediate entry.

Since the point of origination information which is used to select a particular one of a group of terminating stations can be any one of a number of different types, the present invention provides for an appropriate translation (if necessary) between the input region information (which might for example be NPA-NXX) and the zone of origin information, and preparatory to that translation, a determination must be made as to what type of translation is required. Since different customers may require different translations, the procedure is optimized (from the standpoints of processing time consumed as well as the quantity of required storage space) as follows. First the type of input area designating information (whether FG-D or FG-C) is determined. Following that, a specific translation is selected so as to translate the input region information (with respect to geographic point of origin and regardless of form) into all types of the required zone of origin information. In other words, assuming NPA-NXX region information is received, that NPA-NXX is then translated (regardless of the specific customer identification or the type of geographic zone of origin information which is required) into the corresponding subscripts (which is a pointer) for each of NPA, LATA, OGA, state and time zone. Similar translation is implemented in the event that the input geographic region information is FG-C. Clearly, the division (i.e. the zones) can be on virtually any basis, such as postal zip codes, or indeed even on the basis of individual calling party telephone number.

With the input region information translated into zone information as noted above, and with the specific customer subscription record and the dialed 800 number, the data base can then determine an appropriate termination. For those customers who do not use chronological (time based and/or day of week based) termination differentiation, the process is an additional look-up based on the foregoing information to provide the immediate termination data. On the other hand, for customers who have chronological (either time of day and/or day of week) differentiation, the additional look-up produces an intermediate record. A further look-up can produce a termination identification for those customers who use time based and/or day of week based differentiation. For customers who use both time based and day of week based differentiation, the further look-up produces still another intermediate record. For those customers, a final look-up, using the intermediate record produced in the further look-up, identifies the specific termination.

Another degree of flexibility is provided by a plan element in the head entry. Subscribers to enhanced service may have entirely different termination selections defined in a plurality of different plans for that subscriber, including, a basic plan and at least one alternate plan. The subscriber, for example using 800-NXX-XXXX, has head and further entries defined by the key 800-NXX-XXXX. The subscriber may have alternate plan information stored in the data base using the key 8AB-NXX-XXXX, where A and B are integers within the range 0 to 9 (the integers may be identical, in other words A may be equal to B). When the subscriber wants to put an alternate plan into effect the head entry is altered to change the last item in the head entry (the plan number) from 00 to AB. On access to the head entry, when this plan identification is found all further accesses within the data base use an altered 800 number, as the key in lieu of 800-NXX-XXXX. The plan number is, in effect, a modification parameter which is added, within the data base, to the 800 prefix. As a result all further data extracted from the data base for that customer will be data that has been stored for the alternate plan instead of the data which has been stored for the basic plan.

The data base which has been so far described is relatively constant except for maintenance to add data for new customers or to change (on an indefinite basis) data for an existing customer. However a further complicating factor is the handling of holidays. Typically data processing, and the contents of the data base which provides the data extracted, are unchanged any given day of the week. In other words processing on one Tuesday will be identical to the processing for the next Tuesday. However a holiday may actually require that a Tuesday in a given week be treated as if it were a Saturday or a Sunday, for example. Therefore a supervisor data base (which may be a separate data base) stores, for each customer which requires day of week differentiation, the data necessary to provide for this variation. As will be seen this data is extremely simple, typically requiring only the change in a single digit in one or more entries. Periodically, say at the beginning of a week during which there is a holiday, the supervisor data base rewrites some of the data in the data base to account for the holiday. At the end of that week, a complementary rewriting occurs to remove the holiday data. Thus while the data base has provision for only seven days of the week, the supervisor data base stores, and automatically makes effective, a further level of variation to account for non-periodic events like holidays.

Further efficiency is obtained by using a modified form of immediate entry. The immediate entry, as described, includes up to four different termination identifications. If there are different time of day, day of week or region of origins which produce the same termination then the same termination information will be stored in multiple locations of the data base so as to be accessed by the appropriate keys. Changes to the stored data then are required to change every instance at which the data to be changed appears. The modified immediate entry improves efficiency by storing a pointer in the immediate entry in lieu of actual termination information. Thus when the pointer is extracted, access is directed to table of termination identifications. Using this technique the identification of each termination appears only once in the data base, the same pointer may appear in various entries. As a result when changes are necessary it is only necessary to change the single instance of the termination data in the table in lieu of every location where the pointer to that data may appear.

Once the specific termination has been identified, it is transmitted back to the originating switch for call completion as Plain Old Telephone Service (POTS) or in accordance with other call completion methods.

In order to economize on processing time as well as storage space required, the records (of the customer subscription, specifically a head entry) identify the type of originating area identification as either NPA, LATA, state identification, time zone identification or Originating Geographical Area (OGA), or other desired region of origin (e.g. postal zip codes). A further element of the head entry is the number of different originating areas. A third element of the head entry is the originating area array. The originating area array has one element for each different originating area. Each element includes the specific originating area ID or a null to block calls from that area.

In the course of processing, the customer record is identified (based on the 800 number) and the type of originating area is identified. Using the type of originating area selected by the customer, the appropriate subscript (index, based on NPA, LATA, OGA, state and/or time zone or other criteria) can then be selected. If the customer record is neither a basic or immediate record, then differentiation of destination telephone number on originating geographic region will be effected and the customer head entry will contain an originating area array. The array has an OAID element for each valid originating geographic region, other regions have a null entry to block the call. The selected subscript is an index into the array and is used to select the appropriate OAID. As will be appreciated, the originating area array is much more compact than the tables used in U.S. Pat. No. 4,191,860. Once available the OAID is used as a key for further access to the data base.

It will be further appreciated of course that the 800 call processing described herein is but one example of special service call processing in accordance with the invention. The invention may be used to implement other forms of such call processing. For example, it will be apparent that to use the invention in any instance wherein it is desired to utilize a "dummy" number of any kind to further direct calls to selected ones of a plurality of real numbers, the particular ones being determined on the basis of some objective criteria such as calling party location identification, etc.

BRIEF DESCRIPTION OF THE DRAWINGS

The invention will be described in the following portions of the specification so as to enable those skilled in the art to practice the invention when the specification is taken in conjunction with the attached drawings, in which like reference characters identify identical apparatus and in which:

FIG. 3 shows the form and contents of a head entry for enhanced service according to the invention;

FIG. 4 shows the form and contents of an intermediate entry for day band processing according to the invention;

FIG. 5 shows the form and contents of an intermediate entry for time band processing according to the invention;

FIG. 11 shows data flow for enhanced service with full (day and time) chronological processing;

FIG. 12 shows data flow for time based chronological processing;

FIG. 13 shows data flow similar to FIG. 11 but with plan variations;

DETAILED DESCRIPTION OF PREFERRED EMBODIMENTS

Figure 1:
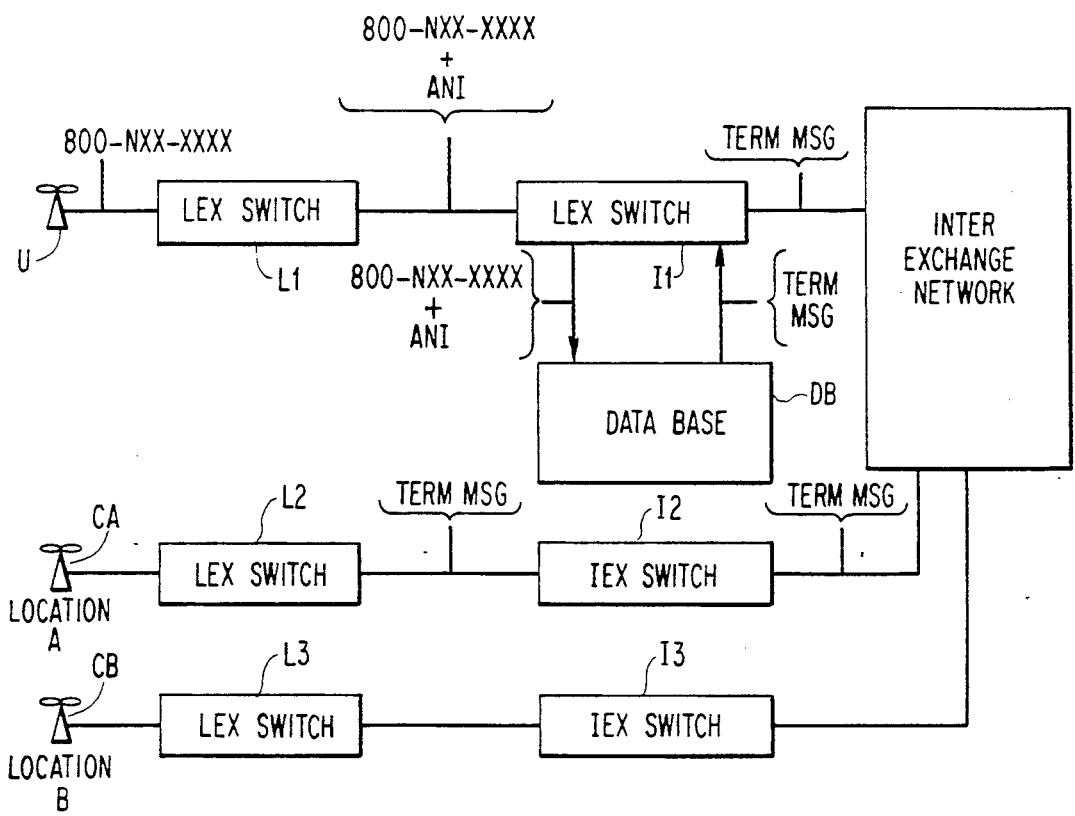
FIG. 1 is a block diagram of portions of the Public Switched Telephone Network and cooperating portions of an Interexchange Network which cooperate in implementing 800 processing according to the invention.

FIG. 1 is a schematic illustration of one application of 800 processing for call completion. FIG. 1 shows a number of telephones, including a user telephone U and a customer telephone CA, at location A, and a customer telephone CB, at a location B. In this description, the user refers to the individual placing an "800" telephone call; the customer is the party to whom the call will be billed. The user's telephone U is connected to a local exchange switch L1, which in turn is connected to an interexchange carrier switch I1. The interexchange carrier switch I1 is connected to the interexchange network. The interexchange network is also connected to other interexchange carrier switches I2 and I3. for example. FIG. 1 shows that the interexchange carrier switch I2 is connected to a local exchange switch L2, which in turn is connected to the customer's telephone CA. FIG. 1 also shows that the interexchange carrier switch I3 is connected to a local exchange switch L3, which in turn is connected to a customer telephone CB. Typically, location A and location B are separate, and thus the local exchange switches L2 and L3 are different.

In order to initiate an 800 call, the user dials 800-NXX-XXXX which, as has been explained, does not identify a particular telephone station and is therefore sometimes referred to as a "dummy" telephone number. Assuming that the local exchange switch L1 is configured for "equal access" (FG-D), it will, on receipt of the customer-dialed digits, transfer to the interexchange carrier switch I1 both the customer-dialed digits as well as Automatic Number Information (ANI) identifying the user telephone U. ANI is either three or ten digits; in either case, it includes the Number Plan Area (NPA) designation for the user telephone U. In addition, it usually includes the so-called directory number (seven digits) of the user telephone U. In order to properly terminate the call, the call must be routed to the appropriate terminating telephone. That information is not contained in the information provided by the local exchange switch L1 and therefore a data base DB is used. The data base receives, from the interexchange carrier switch I1, both the dialed 800 number, i.e. 800-NXX-XXXX, as well as ANI. Using this information, in a manner to be described, the data base derives a termination message which will identify the appropriate terminating telephone station, in this example either CA or CB. The termination message is provided back to the interexchange carrier switch I1 where it is used, along with the interexchange network, the appropriate interexchange carrier switches and local exchange switches, to terminate the call, i.e. connect the call to the appropriate location.

While the data base DB could be co-located with the switch I1, typically it is not so co-located. Rather, a very few data bases DB serve the entire interexchange network. To this end, the interexchange switches are coupled to an appropriate data base via a signalling network. In FIG. 1 the signalling network carries information from I1 to DB and the message from DB back to I1.

Figure 2:
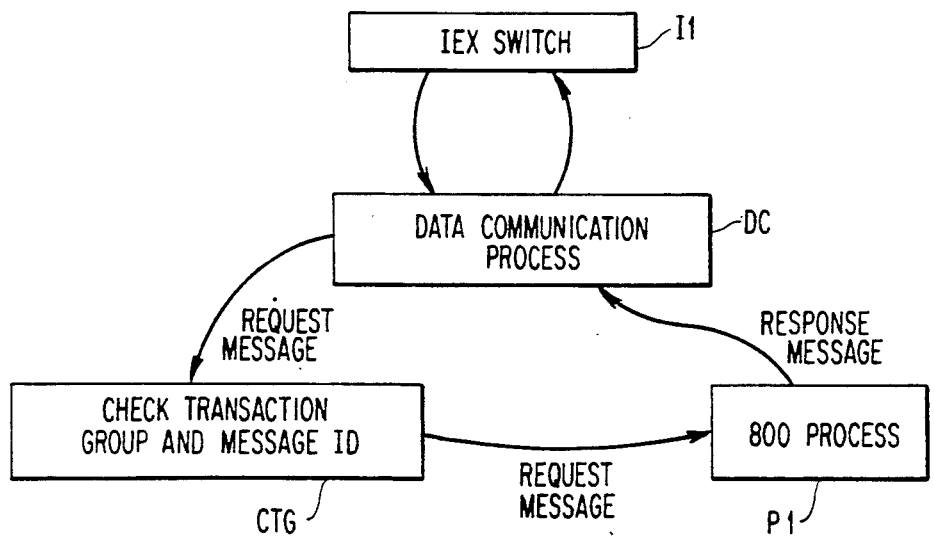
FIG. 2 is a high level flow diagram of the processes carried out in the interexchange switch and cooperating data base to implement processing according to the invention.

FIG. 2 schematically illustrates the processes carried out between a particular interexchange carrier switch and a particular instance of the data base DB. More particularly, when the interexchange switch such as the switch I1 identifies receipt of an 800 call, it initiates a data communication process DC. The data communication process DC formulates a request message which includes at least the dialed 800 number along with region information (based on either FG-D or FG-C). In this initial example, FG-D processing will be described. The request message is fielded by a check transaction group and message ID function CTG of the data base DB. The purpose of the function CTG is to identify what particular request or function should be implemented to handle the request message. Typically, the data bases such as DB handle functions apart from the 800 processing. Thus, for example function CTG identifies from the request message that this is an 800 call and therefore function CTG formulates a request message to an 800 process P1. The request message formulated by function CTG includes at least the dialed 800 number as well as the FG-D data. The 800 process, function P1, will be defined in detail hereinafter. The result of the 800 process is the formulation of a response message which is transmitted back to the data communication process DC. The response message typically will include the identification of a termination station. The data communication process DC, on receipt of the response message, transmits it back to the interexchange carrier switch I1.

Figure 7:
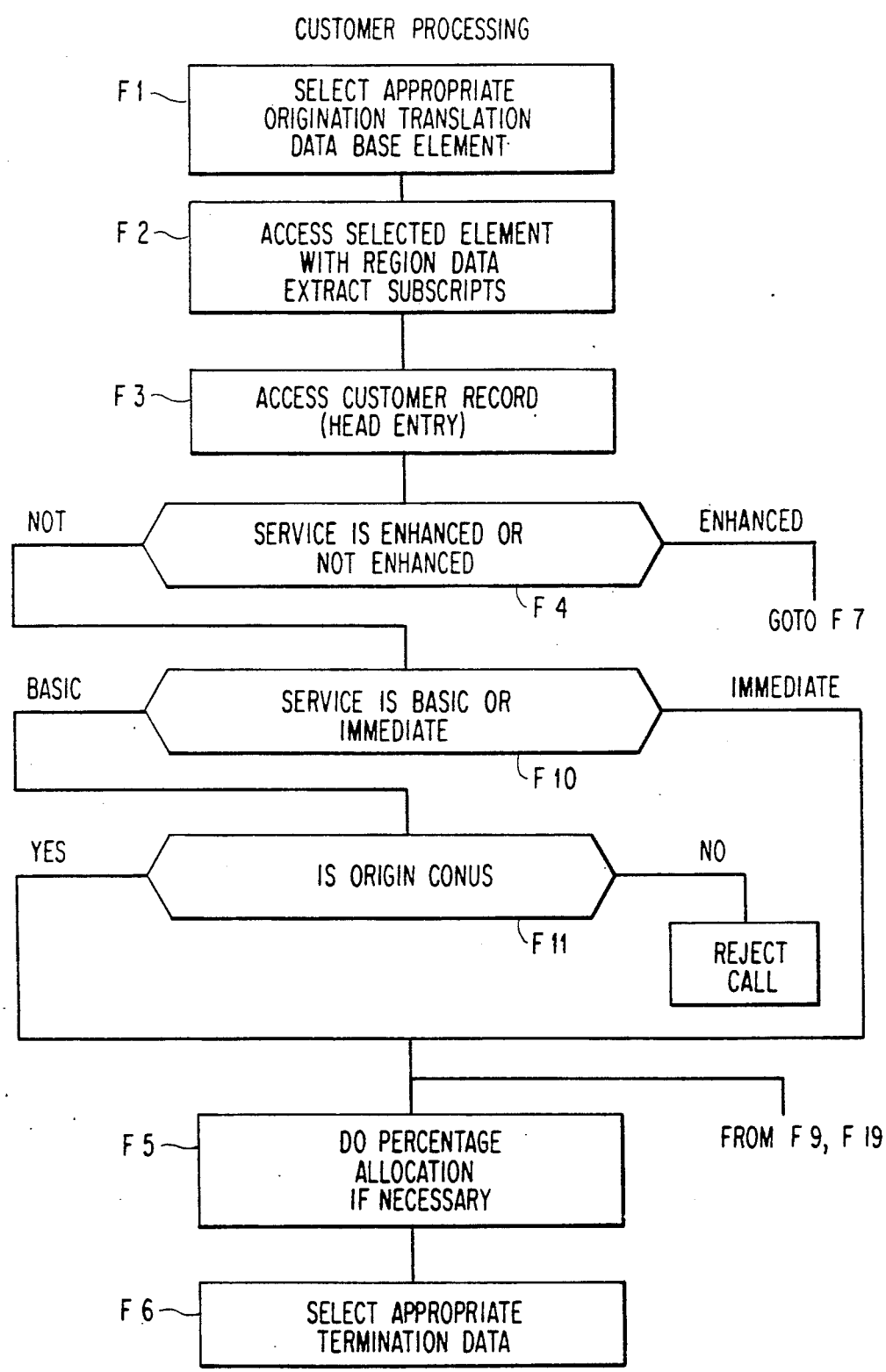
FIG. 7 is a flow diagram for 800 processing according to the invention.
Figure 8:
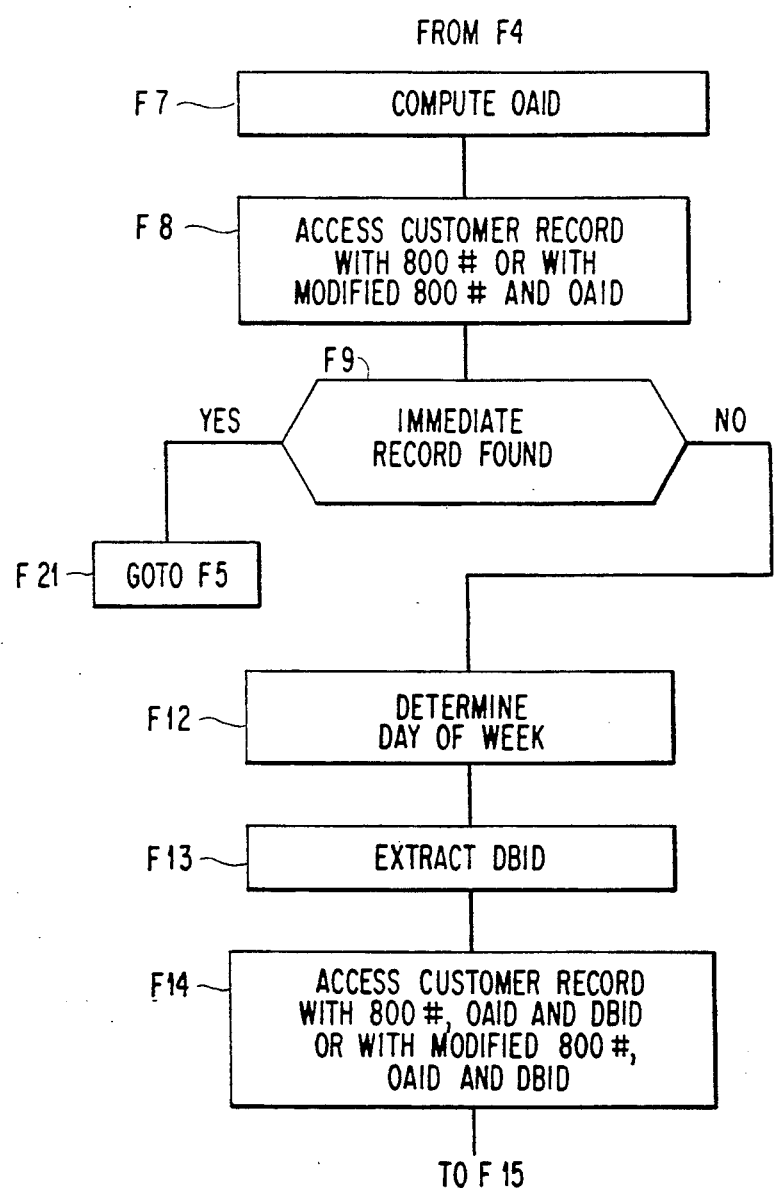
FIGS. 8 and 9 are continuations of FIG. 7 for enhanced processing according to the invention.
Figures 9, 10:
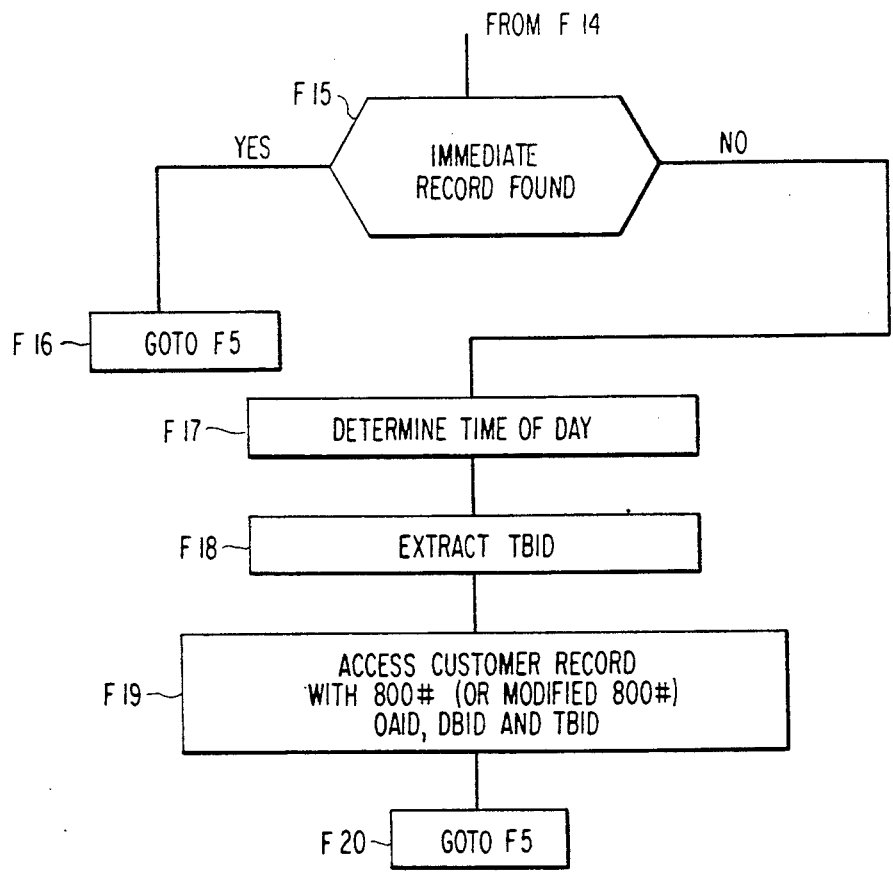
FIG. 10 shows data flow for basic service.

FIGS. 7-9 illustrate the 800 process function P1. The function includes accessing an origination translation data base element (F1), using the received region data to extract the corresponding subscripts for the origin zone for all origin zone identification criteria. Thereafter the customer subscription record is accessed (the first access is to the head entry) at function F3. At this point (F4) the process may branch to F7 (FIG. 8) for enhanced service. If the customer's service is not enhanced (as determined from the head entry) then (F 10) a determination is made, from the same entry, whether service is basic or immediate. If the service is basic then F 11 checks whether the call originated within the continental United States. Since basic service is provided only for calls originating within the continental United States the call may be rejected. If not, or if service is immediate then functions F5 and F6 select the appropriate termination data. The processing for enhanced service (FIGS. 8 and 9) includes accessing other customer subscription entries based on a key which is built up with data extracted from prior accesses.

Before describing execution of these processes, several components of the data base which are essential to this processing will be described.

The data base DB includes a number of origin region translation elements; two of them are FG-C 800 and FG-D 800. The first element (FG-C 800) is used to identify NPA, LATA, state, time zone and OGA subscripts in the event that the local exchange switch L1 is not configured for equal access, i.e. the switch provides so-called feature group C service. Table 1 shows the components of this data base element. For every originating switch/originating trunk group and OOY code, the data base includes a corresponding NPA subscript, LATA subscript, state subscript, time zone subscript and OGA subscript. Accordingly, when an 800 request message is received which originated via a local exchange switch L1 not configured for equal access (a switch providing feature group C service), reference to the FG-C 800 data base element with the OOY code will return the specified subscripts.

A second origin region translation element in the data base is provided for the case of 800 request messages originating via a local exchange carrier switch L1 which is configured for equal access service (so-called feature group D). The components of this FG-D 800 element are shown in Table II. The data base includes the same data elements as are included in the FG-C 800 element but they are keyed on NPA and NXX of ANI. Accordingly, for 800 request messages which originate via a local exchange carrier switch L1 providing ANI, reference to the FG-D 800 element of the data base DB will return the appropriate (NPA, LATA, state, time zone and OGA) subscripts. In the event the ANI data includes only NPA (and not the NXX component), the data base FG-D 800 element has default subscripts keyed solely on NPA.

TABLE I

| File Name: | FG-C 800 |
|---|---|
| Key Element(s): | Originating Switch |
| | Originating Trunk Group |
| | OOY Code/800 Prefix |
| Data Element(s): | NPA Subscript |
| | LATA Subscript |
| | State Subscript |
| | Time Zone Subscript |
| | OGA Subscript |

TABLE II

| File Name: | FG-D 800 |
|---|---|
| Key Element(s): | NPA (of ANI) |
| | NXX (of ANI) |
| Data Element(s): | NPA Subscript |
| | LATA Subscript |
| | State Subscript |
| | Time Zone Subscript |
| | OGA Subscript |

The data base DB also includes an 800 customer subscription record for each different customer. The customer subscription record includes at least one, and perhaps several, discrete entries, depending on the service offered to the subscriber. Subscribers using basic or immediate service may have only a single entry. This is also the case for subscribers whose service is discontinued. All other subscribers have enhanced service with at least two and perhaps more entries as will be described below. The record for all subscribers includes a head entry and optionally one or more supplemental entries. The head entry is addressed solely by the 800 number. The head entry includes an 800 service flag which can be one of six types. Particularly, 0=basic, 1=enhanced, 2=chronological, 3=remote, 4-discontinued and 5=immediate.

The head entry for basic and immediate service subscribers includes, in addition to the service flag, a field identifying the number of allocation arrays and, in addition, for each allocation array, 1-4 elements where each element includes a field identifying the percentage allocation for is element (in the range 0--100) and termination data. The termination data includes a field which identifies one of five different termination data formats. The following table (Table III) identifies each of the five different formats for termination data showing typical data size (in bytes), the form of the data, and the range for the data element.

Table III

| | Termination Data | | |
|---|---|---|---|
| Term Data Type | 1 byte | binary | 0-4 |
| Term Data - Format 0 - International Routing | | | |
| Action Code | 1 byte | binary | 4 |
| Partition ID | 2 bytes | binary | 0-1023 |
| Outpulse Dig Len | 1 byte | binary | 0-14 |
| Outpulse Digits | 7 bytes | IBCD | |
| or | | | |
| Term Data - Format 1 - NPA Routing (ODD) | | | |
| Action Code | 1 byte | binary | 3 |
| Partition ID | 2 bytes | binary | 0-1023 |
| Outpulse Dig Len | 1 byte | binary | 10 |
| Outpulse Digits | 7 bytes | IBCD | |
| or | | | |
| Term Data - Format 2 - 7D DAL Routing | | | |
| Action Code | 1 Nibble | binary | 1,2 |
| Terminating Switch | 2 bytes | IBCD | 000-999 |
| Trunk Group | 2 bytes | binary | 0-4095 |
| Routing Info | | | |
| Feature Code | 1 byte | binary | 0-63 |

Table III-continued

| Term Data Type | Termination Data | | |
|---|---|---|---|
| | 1 byte | binary | 0-4 |
| Term Network | 1 Nibble | binary | 0-15 |
| LCR Flag | 1 Nibble | binary | 0-1 |
| Out Dig | 7 bytes | IBCD | 0-9999999 | or

Term Data - Format 3 - Modified 7D DAL Routing

| | | | |
|---|---|---|---|
| Action Code | 1 byte | binary | 1 |
| Terminating Switch | 2 bytes | IBCD | 000-999 |
| Trunk Group | 2 bytes | binary | 0-4095 |
| Routing Info | | | |
| Feature Code | 1 byte | binary | 0-63 |
| Term Network | 1 Nibble | binary | 0-15 |
| LCR Flag | 1 Nibble | binary | 0-1 | or

Term Data - Format 4 - 10D DAL Routing (Real Time ANI)

| | | | |
|---|---|---|---|
| Action Code | 1 byte | binary | 10 |
| Terminating Switch | 2 bytes | IBCD | 000-999 |
| Trunk Group | 2 bytes | binary | 0-4095 |
| Virt Trunk Start | 2 bytes | binary | 4096-9999 |
| Routing Info | | | |
| Feature Code | 1 byte | binary | 0-63 |
| Term Network | 1 Nibble | binary | 0-15 |
| LCR Flag | 1 Nibble | binary | 0-1 |

It will be apparent from the foregoing that with basic or immediate service, a first lookup (F3) to the data base, based on dialed 800 number will generate a termination message identifying the appropriate terminating facility. If there is no allocation used, the termination message will identify the sole terminating identification in the head entry. If allocation (i.e. the split of calls between terminating stations on a percentage basis) is used, the terminating facility will be determined in accordance with the allocation data. For example, for 50% allocation to two different terminations, the termination data extracted will randomly select the first termination or the second on each access.

On the other hand, if the service supplied to the subscriber is enhanced service, then the head entry includes (see FIG. 3), in addition to the enhanced service flag, a geographic band section. The geographic band section has a field identifying the type of originating zone, of the five different zone criteria. Thereafter, the head entry includes an additional field identifying the number of originating areas and an originating area identification array which includes a field for each of the different originating areas. Each field contains a numerical value in the range of 0-255. The number of originating area identifications in the array depends on the type of originating area. The number of elements in the originating area array is shown in the following table. It should be apparent that wide variation in this table is possible. For example, although geographically there are only four continental U.S. time zones, an additional four are available for further flexibility which can be expanded further if desired. While the originating area array is used for termination selection based on zone of origin of the call (sometimes called port of origin routing), it can also be used for tailored call coverage. Tailored call coverage allows the customer to select service originating in less than all zones of origin. The customer may select, for example, calls originating only in the Mountain and Western time zones. In this case, the OAIDs for the Mountain and Western time zones are keys to further entries whereas the Eastern and Mid-West time zones have OAIDs which do not access further entries. As a result, calls from the Eastern and Mid-West time zones are blocked.

TABLE IV

| Type of Originating Area | Number of Elements in Originating Area Array |
|---|---|
| | Number of Elements in the Array |
| NPA | 160 |
| LATA | 123 |
| OGA | 450 |
| STATE | 52 |
| TIME ZONE | 8 |

In the case of enhanced service, the first lookup (F3) will determine that the customer has enhanced service. Using the originating area type, the appropriate origination subscript is selected from the previous translation. In other words, use of the Origination Translation Element appropriate to the type of input (FG-D, FG-C) and the region information extracts the five subscripts (for example). The customer record identifies the specific type of differentiation allowing selection of the appropriate one of the five subscripts. With the subscript and the array itself, the Originating Area ID (OAID) is extracted. Referring to FIG. 3 for example, there are N Originating Area ID s (OAID) stored in a given order. Previous processing will have specified a specific subscript. The OAID is then selected by merely counting down in the array to the extent indicated by the specific subscript. The OAID will be used in further data base accesses as will be described. It will be apparent that this form of data storage and data processing has substantial advantages over that described in U.S. Pat. No. 4191860. For example, the patent describes use (for each possible area) of 3 digits to identify the area and 10 digits to identify the destination telephone number. In contrast the invention uses the originating area subscript as an index and so does not store area originating information at all in the customer record. Rather that information is implicit in the order of the array. Each area simply has a 1 byte element, the OAID, rather than a 10 digit telephone number. Data processing speed is enhanced since selecting the appropriate OAID merely requires counting to the appropriate element rather than the slower comparison suggested in the patent.

The 800 subscription record data base includes other supplemental entries for subscribers using enhanced service. One of those entries is similar to the basic or immediate 800 record in that it identifies the number of allocation arrays and includes one or more allocation data arrays which among other things includes the termination data. For the enhanced service subscriber who does not use chronological termination differentiation (time of day and/or time of day and day of week), the immediate record is the only other element of the 800 subscription record. If, however, the subscriber has termination differentiation based on day of week/time of day, there are further entries.

Of the subscribers who use day of week differentiation, there are one or more day of week chronological entries (see FIG. 4). There is one entry for each different originating area identification. Each entry includes a day band array having one field for each of the possible days of the week. See FIG. 7. This entry is accessed using both the 800 number and the OAID. Access results in extraction of a Day Band ID (DBID) based on present day of week. The other possible chronological differentiation is time of day differentiation and if a subscriber's service includes this type of differentiation, there are additional entries in the 800 subscription record data base. The format of that entry (see FIG. 5) includes a time band section which carries a first field for identifying the number of time band arrays. For time resolution of 30 minutes, for example there are as many as 48 elements of the array. Each array includes stop time identification (two bytes and a corresponding time band ID of one byte). With this technique there are only as many elements as necessary. For example, to differentiate a 9AM-5PM segment of a day, there need be only two entries. A first TBID has a stop time of 0900, a second has a stop time of 1700. The second TBID is different from the first. Time band entries are accessed with 800 number, OAID and DBID. The TBID is selected based on present time of day.

In response to a given 800 request message (after performing functions F1 and F2 of FIG. 7), the data base effects a first data base look-up (F3) into the customer subscription record based on the 800 number received. For customers using basic or immediate service, that single look-up will suffice to extract termination data from which the termination message is derived (F5, F6). For enhanced service subscribers, at least a second look-up (F8) is required; whereas the first look-up (F3) was based solely on the 800 number, the second look-up is based on the combination of the 800 number look-up and the OAID. For customers that do not employ chronological differentiation, the second look-up will extract termination data from which a termination message can be fashioned. Chronological differentiation can be based on time of day, day of week, or both. In one embodiment, customers who use any form of chronological differentiation have records stored for both day of week and time of day differentiation. There is a day of week entry (array) and a time of day entry (array). Access to the day of week entry along with the present day of week produces a Day Band IDentification (DBID). Access to the time of day entry along with the present time of day produces a Time Band IDentification (TBID). Customers who do not use differentiation based on day of week use only a single DBID in each location of the array. Customers who do use differentiation based on day of week use different DBID's in different locations of the array. Customers who do not use differentiation based on time of day use a one-element time array with a stop time of 2400 (midnight) and a single TBID. Customers who do use differentiation based on time of day use different TBID's in different locations of the array. In chronological processing, assuming that the second look-up (using 800 number and originating area ID) produces a day band ID, then the third look-up (F14) is based on the 800 number, originating area ID and day band ID. For these subscribers, the fourth look-up (F19) is based on 800 number OAID, DBID and TBID.

Figure 6:
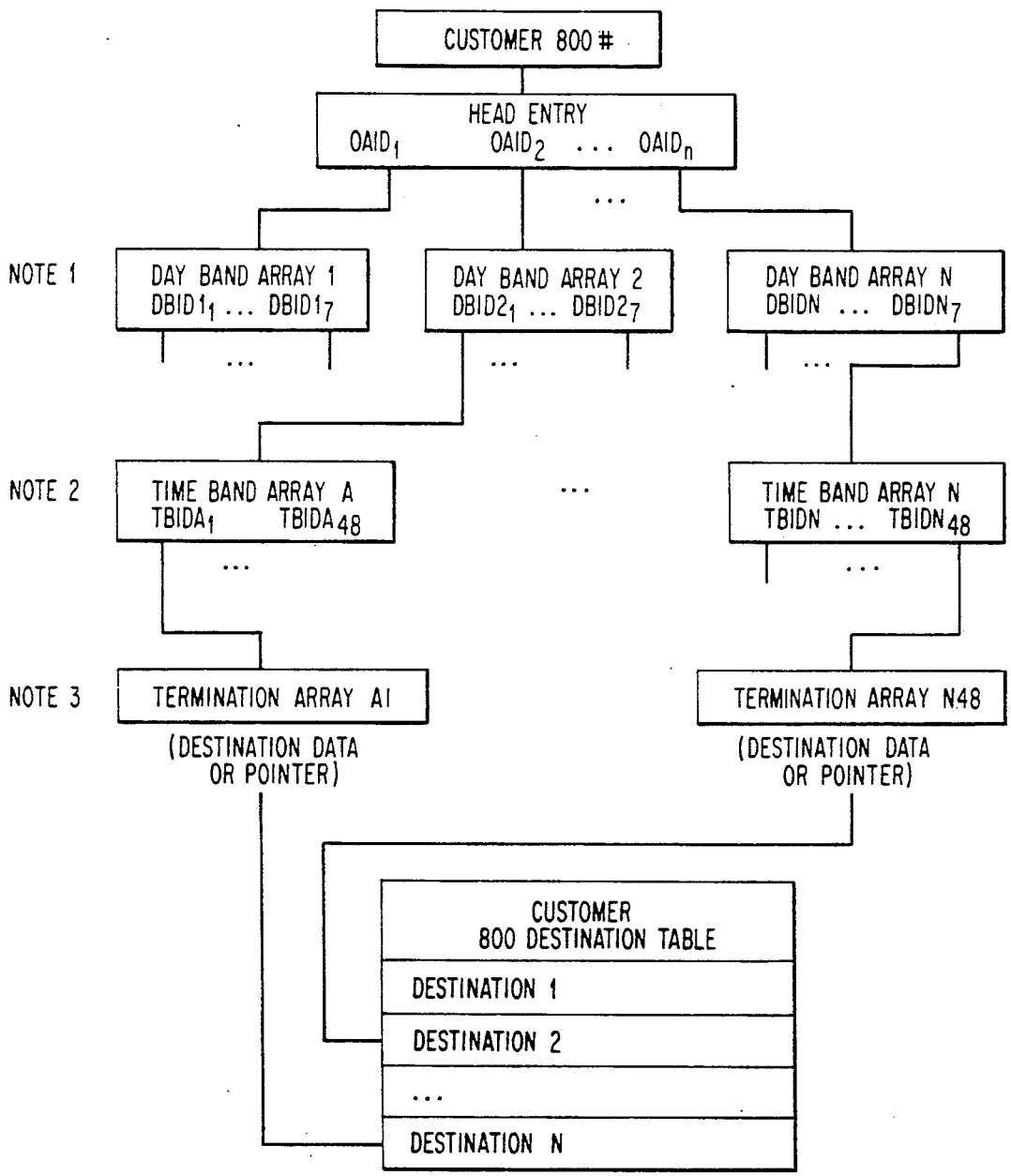
FIG. 6 shows in schematic fashion the several modular elements of a customer record for enhanced service according to the invention.

FIG. 6 is a cross-section of a typical customer subscription record for enhanced service. The head entry HE is accessed by the dialed 800 number. The HE includes a geographic array with a number of elements based on the type of region identification (NPA, LATA, OGA, time zone or State) selected by the customer. Each element includes an OAID (although each OAID is not necessarily unique). FIG. 6 shows the HE has N different OAIDs. Since each different OAID provides access to a different Day Band array in this example there are N Day Band arrays in the subscription record, FIG. 6 shows representative Day Band arrays DBA1, DBA2 and DBAN. Each Day Band array has seven elements, each with a DBID, although not all DBIDs are necessarily unique. Each different DBID provides access to a different Time Band array, so the number of Time Band arrays depends on the number of different DBIDs.

FIG. 6 shows two representative Time Band arrays, TBAA and TBAB. Each Time Band array has 48 elements, each with a TBID, although all TBIDs are not necessarily unique. Each different TBID may provide access to a different Termination array, FIG. 6 shows representative Termination arrays TAI and TAN48.

Each Termination Array may include destination data of the form already described for immediate or basic service.

The preceding description is summarized in FIGS. 10-13 which show examples of data flow with several of the different processing variations.

FIG. 10 shows the data flow in connection with basic service. FIG. 10 is a table with three columns; the first column identifies the function being performed, the second column identifies the input data, and the third column represents the output data. The first function, F1, uses region information received at the data base which is coded either as FG-D or FG-C. The type of information which is received (FG-D or FG-C) is used to select the appropriate origination translation data base element. Using the input data, the appropriate data base translation element returns the five subscripts for any particular region which is identified in the input information. The next function, function F3, uses as input data the 800 number in order to access the customer subscription record. In the example of basic service, that access retrieves service code and termination data. The service code data is used, in function F3, to select the subsequent processing, in this case function F5. Finally, the last line on FIG. 10 shows that function F5 uses the termination data to identify the appropriate termination message for this particular call.

FIG. 11 is similar to FIG. 10 except that it represents data flow for enhanced service using full chronological processing (that is, both time of day and day of week differentiation). Step F1 in FIG. 11 is identical to step F1 in FIG. 10. Step F3 uses the same input information as was the case in FIG. 10 but for the example shown in FIG. 11, the result of that data base access is the service code representing enhanced service, originating type and originating area array. Step F4 uses the service code extracted in step F3 to select appropriate subsequent processing, in this case function F7. The next line in FIG. 11 shows that function F7 uses the originating area type (extracted in the access at function F3) with which to select the appropriate subscript from the group of subscripts extracted in step F1. Function F7 thereafter uses the selected subscript (selected in the previous step) along with the originating area array to extract the OAID. Function F8 is then a subsequent access to the data base using the subscriber's 800 number along with the OAID extracted in function F7. The result of this processing is either production of termination data (if the entry was an immediate entry) or extraction of a day band array (since this example is based on full chronological differentiation, i.e. time of day and day of week). Function F12 thereafter uses current chronological time parameters to extract day of week. Function F13 then uses the day of week extracted at function F12 along with a day band array extracted at function F8 and selects a DBID. Function F14 then uses the 800 number, the OAID and the DBID to access the customer subscription data base for the third time. In this example, the access extracts a time band array. Function F17 then again obtains current chronological parameters, specifically time of day. Function F18 then uses the time of day extracted at function F17 along with the time band array extracted at function F14 and selects a TBID.

Function F19 thereafter uses the 800 number, the OAID, the DBID and the TBID to extract termination data. Actually, those skilled in the art will recognize that function F19, on accessing the customer subscription data base, will produce an immediate record and thereafter functions F5 and F6 are performed, which will result in selection of the appropriate termination message.

FIG. 12 differs from FIG. 11 in that the data flow described in the example accesses a customer record which uses only time of day differentiation and does not use day of week differentiation. Thus, on the second access to the customer subscription data base (function F8) a time band array is extracted (compare the result of this access to the same access in FIG. 11 which extracts a day band array). Function F17 thereafter accesses current chronological parameters, specifically time of day. Function F18 thereafter uses current time of day extracted at function F17 along with the time band array extracted at function F8 to select a TBID. Thereafter, function F19 is performed which is in all respects identical to function F19 in FIG. 11.

Based on the preceding, those skilled in the art will understand that in enhanced service, the customer subscription record is broken into different entries. The head entry may be of the form shown in FIG. 4. Processing with this entry extracts an OAID. In the event the customer subscription record includes both day band processing and time band processing, the combined key of the 800 number and the OAID will point to a day band array in the data base. Of course, there may be several day band arrays for this particular customer in the customer subscription record. Typically, there will be as many different day band arrays as there are different OAIDs (although this is not essential).

FIG. 13 is an example of the data flow for enhanced service with full chronological processing along with the plan variation.

The last entry in the HE (see FIG. 3) is the Plan Number. The Plan Number designates one of a potential set of 99 records for the specific customer. One such record of the set has the form shown in FIG. 6. All other records have two differences from the record illustrated in FIG. 6. One difference is that each other record omits the HE (there is only one HE per customer regardless of the number of plans). The second difference is that whereas all entries for the basic plan (Plan Number 00) use as a key (or a part of the key) the dialed 800 number, all other plans use as a key a modified 800 number, particularly the sum of the plan number the prefix 800. For example plan number 01 accesses the data base (aside from the HE) with 801-NXX-XXXX rather than 800-NXX-XXXX. The modification occurs within the data base and is not apparent to calling parties who continue to use the same 800 number. This allows further flexibility in that the processing can be altered merely by changing the Plan Number entry in the HE. On accessing the head entry, the effective plan number is identified and used as shown in FIG. 13. More particularly, at function F7 when the head entry is accessed and the plan number is identified, it is used in the next customer subscription data base access, i.e. function F8. Function F8 is an access to the customer subscription data base using an 800 number and OAID as the keys. When an alternate plan is in effect (as evidenced by the existence of a non-zero plan number in the head entry), the 800 number component of the key used to access the customer subscription record in function F8 is not the dialed 800 number, but is that number modified by the plan number (i.e., the plan number is a modification parameter). For example, 99 different plans can be differentiated with a 2-digit number. If the plan number stored in a head entry for example were 04, then function F8 would use not 800-NXX-X=-XXX, but rather 804-NXX-XXXX. Those skilled in the art will understand how the use of 800-NXX-XXXX and OAID will access one entry in the data base whereas the use of 804-NXX-XXXX and OAID will access a different entry in the data base. Naturally, the different entry which is accessed by using the modified 800 number will have different data therein, to implement the differences between the basic plan and the alternate plan 04 in effect. Other alternate plans using designations different from 04 could also be implemented by merely changing the plan number identification in the head entry.

The termination data, in the case of a dedicated access line (DAL) termination includes a Direct Termination Overflow (DTO) flag as part of the action code field (see Table III). Thus when the termination data is extracted from the data base and sent back to the originating switch, the DTO flag is sent to the terminating switch identified by the termination data. The DTO flag indicates to the terminating switch that if the identified termination is busy there is provision for alternate routing. Therefore if the terminating switch cannot complete the call because the terminating DAL is busy the terminating switch formulates and transmits a message back to a data base (which may be different from the original data base). The message identifies the switch, the selected termination trunk group and the DTO flag. The data base, based on the data contained in the message identifies an alternate termination. Information identifying the alternate termination (which need not be a DAL) is then passed back to the terminating switch so the call can be forwarded to the alternate termination. Since this message does not include a DTO flag there is no provision for further forwarding in the event the alternate termination is also unavailable. This prevents the call attempt for continuously shuttling from one termination attempt to another.

Finally, the description so far has referred to immediate entries of the form shown in Table III. For a subscriber which employs for example three different day of week factors, two different time of day factors and five different originating regions, there may be as many as 30 different immediate entries. These 30 immediate entries may or may not include similar or identical termination data. Nevertheless, when the termination data must be changed, it is necessary to correct each of the different affected entries. In order to improve efficiency in accordance with a further embodiment of the invention, immediate entries do not include termination data. Rather, those immediate entries include, in lieu of termination data, termination information in the form of pointers. The pointers are used to point to a table of termination data. For example, the same subscriber with 30 different immediate entries may use up to 30 different terminations, although that is also not essential. The immediate entries then would include a pointer of sufficient length to differentiate the number of different terminations. For example, if 30 different terminations were actually employed, the pointers could be one byte long (sufficient to differentiate 256 different terminations). The customer's termination table then would be accessed based for example on the 800 number, plus a flag to indicate the termination table was being accessed. Once the termination table was available, the pointer would select among the different entries in the termination table to identify that one termination, including the termination data corresponding to the selected pointer. Using such a termination table means that the termination data exists in the customer subscription record in only one location, thus simplifying modifications.

Figure 14:
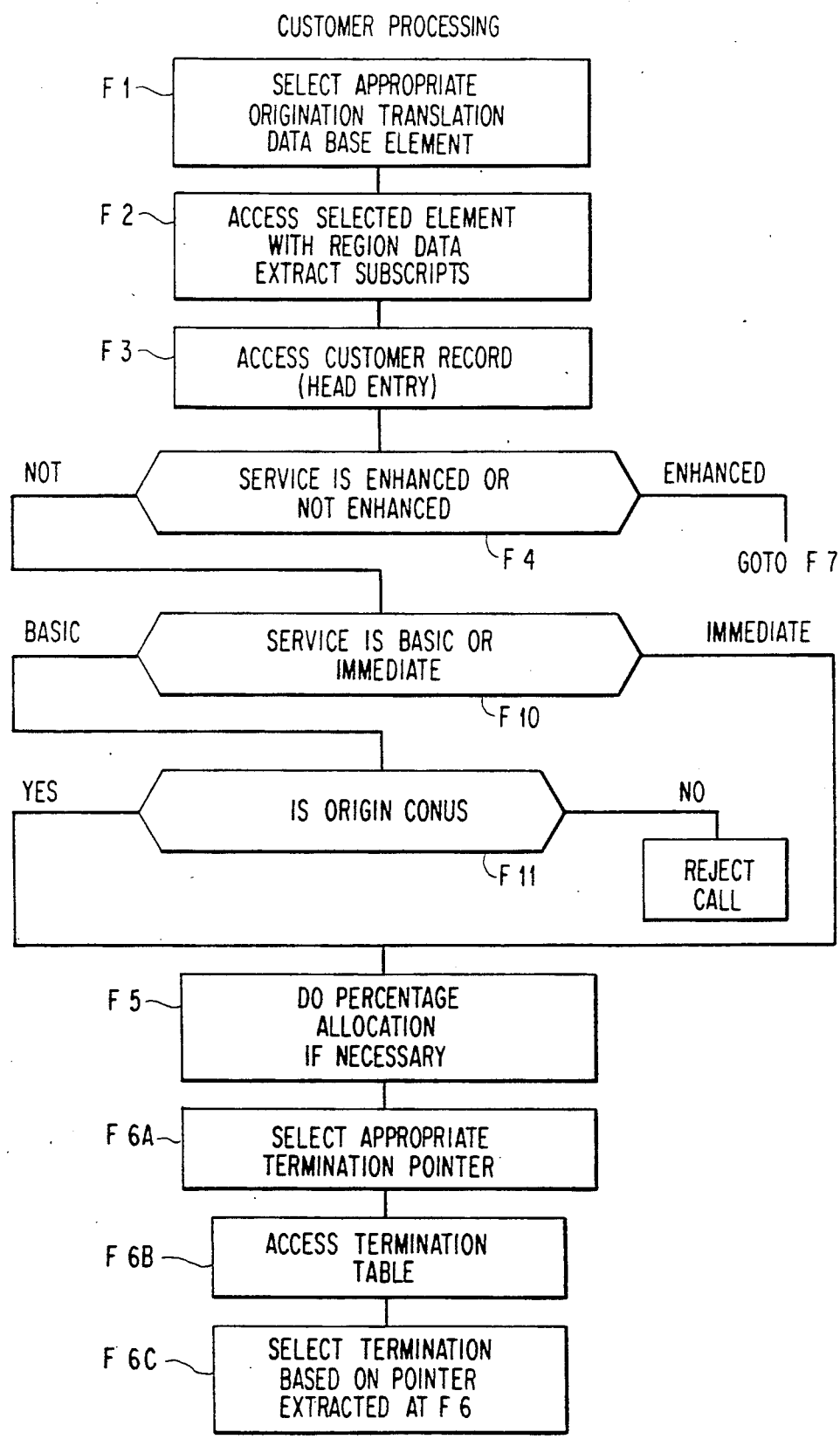
FIG. 14 is a modification to FIG. 7 to employ a termination table.

Immediate entries have, in lieu of the termination data, a pointer (for example one byte) for each different possible termination. The termination table is merely a list of the termination data, ordered according to the corresponding pointer. FIG. 14 shows how processing is altered using the termination tables. Functions F1 to F5 for FIG. 14 are identical to functions F1 to F5 of FIG. 7. Function F6 of FIG. 14 differs from function F6 in FIG. 7. As shown in FIG. 14, function F6 selects an appropriate termination pointer (not the appropriate termination data). Thereafter, function F6a accesses a termination table (based for example on customer 800 number with an appropriate flag to direct the access to the termination table for this customer). Function F6b thereafter selects the appropriate termination data based on the pointer extracted at function F6. Processing otherwise is the same as has been described. An example of the use of a termination table is found in FIG. 6.

It has already been explained that chronological processing can be either one or both of time of day and day of week. If desired, the records can be configured, and the processing altered, to provide for only one type of chronological processing. To so alter the processing sequence there need be only one additional test, after function F 9 and before F 12 to determine whether the accessed record is a day of week array or a time of day array. If the record is a day of week array then the sequence is otherwise the same. If the record is a time of day array then there is a jump to step F 17.

FIG. 6 shows the layout of a customer record and how the various entries are accessed for the example of a customer with enhanced service. The head entry HE has a geographic array with a number of OAID's, the number of elements in this array depends on the type of differentiation (NPA, LATA, etc.). The number of different OAID's is completely at the customers selection (although if all were identical there would be no purpose for using the power of geographic differentiation). In other words there may be, and usually are several elements of the array with the same OAID. However once having extracted an OAID, then using the OAID and the dialed 800 # (or a variant in the case of an alternate routing plan) access again to the data base will extract one of a number of day band arrays. The number of day band arrays is equal to the number of different OAIDs (and not to the number of elements in the geographic array). A selection within the day band array (based on the current day of week) allows selection of a DBID. Again while the number of elements in the day band array is seven, there may be, and there usually are, less than seven different DBIDs. A further access to the data base using the OAID, and the dialed 800 # (or a variant in the case of an alternate routing plan) and the DBID will extract one of a number of time band arrays. There is a time band array for each different combination of OAID and DBID. Like the day band array, the time band array has a given number of elements (in one embodiment 48, one for each different 30 minutes of a day) but there may be, and usually is, less than 48 different TBIDs. A selection within the time band array is made to extract that element corresponding to the current 30 minute period of the day. A further access to the data base using the OAID, the dialed 800 # (or a variant in the case of an alternate routing plan), the DBID and TBID will extract one of a number of termination arrays. The termination array, in one embodiment includes one or more termination numbers selection of which is the purpose for the processing. In another embodiment the termination array includes one or more pointers. In this embodiment a final access to the data base with the dialed 800 # (or a variant in the case of an alternate routing plan) a flag to designate access to a destination table provides access to the destination table. The pointer provides for a selection of that desired termination from among those terminations identified in the table.

As has already been mentioned, holidays are an exception to day of week routing that is not provided for in the data base already described. To the extent customers operate identically during all seven days of week then holidays may not require special treatment. On the other hand, some customers want to treat some or all holidays as the same as a different day of the week (Saturday or Sunday for example) and to this extent holiday treatment is an exception. For those customers, a supervisor data base (or a region of the data base already described) stores a holiday Day Band array specific to the week in which a holiday falls. The holiday Day Band array may be identical to the normal Day Band array except that the DBID for the holiday day is different than the DBID for that day in a non-holiday week. For example a non-holiday array may be 2 1 1 1 1 1 2 (where each digit corresponds to a different day of the week, Sunday is the first day and Saturday is the last day). A holiday array for a week where Wednesday is a holiday may be 2 1 1 2 1 1 2. At the beginning of a week with a holiday (for example at midnight Saturday evening) the supervisor data base extracts the day band array for the holiday week and substitutes it for the customers non-holiday day band array by rewriting the customer subscription records in the data base. At the end of the holiday week a complementary rewriting occurs to remove the effect of the holiday day band array.

Figure 15:
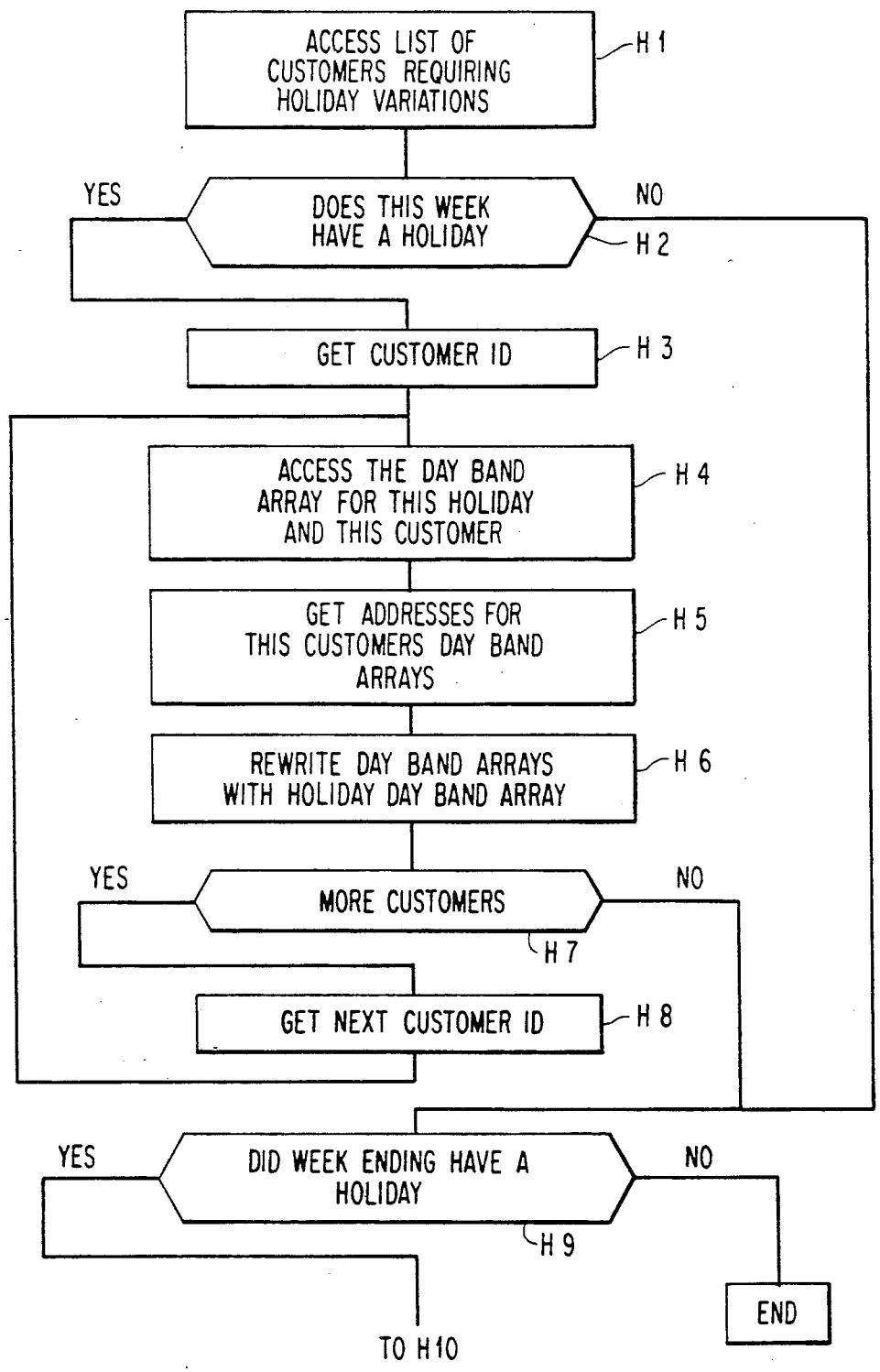
FIGS. 15 and 16 show processing for varying day band arrays to account for holidays.
Figure 16:
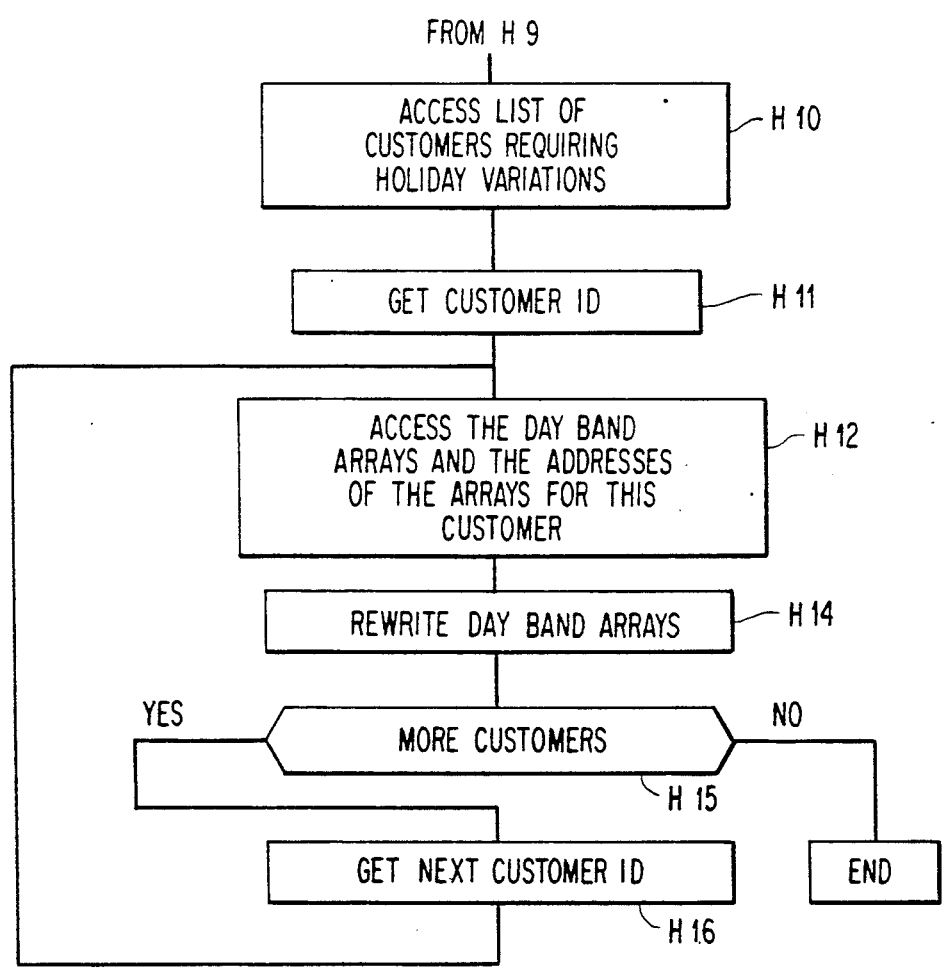

Processing is shown in FIGS. 15 and 16. The supervisor data base (or supervisor region) stores a list of customers who require holiday processing (variations for holiday weeks) and a list of weeks which include one or more holidays. Function H1 accesses the list of customers and function H2 determines if the upcoming week includes a holiday. For each customer the supervisor data base has a copy of a specific day band array for the specific week as well as a copy of the customers non-holiday day band arrays and their addresses in the data base. If the upcoming week has a holiday then function H3 selects the first customer on the list. Functions H4 and H5 accesses the specific holiday band array for this customer and the specific week as well as the addresses in the data base where the holiday array is to be rewritten. Function H6 rewrites the arrays. Function H7 determines if the entire customer list has been processed, and if not function H8 gets the next customers ID. The loop of functions H4-H6 and H8 is executed for each customer on the list. When all customers have been processed, or if the week does not contain a holiday function H9 is executed to determine if the week ending had a holiday. If it did then functions H10, H11, H12, H14, H15, H15 and H16 are executed to remove holiday day band arrays that had previously been written.

Using the same techniques time band arrays can be altered to account for holiday variations as well.

It should be apparent from the foregoing that the invention thus provides efficient and flexible special service call processing. While the specification has described a specific embodiment directed at 800 or IN-WATS special service call processing, those skilled in the art will appreciate that the invention can be applied to a wide variety of special service call processing. Accordingly, the invention is to be construed in accordance with the claims attached hereto and not limited by the specific example described in the specification.

We claim:

1. A method of identification of a termination for a telephone call directed to a dummy telephone station as one of a plurality of different terminations based on a zone of origination for the call as well as on a chronological factor comprising the steps of:
   (a) storing in a data base a record for said dummy telephone station including a hierarchy of at least three data arrays, each data array but one including a plurality of elements arranged in a predetermined order with data used for accessing a further array in the hierarchy, said one array of the hierarchy including termination information, a first of said data arrays further including a modification parameter,
   (b) receiving, at said data base, information about said call including identification of said dummy telephone station and region information identifying a region of origination of said call,
   (c) accessing said record for said dummy telephone station,
   (d) selecting an element from one of said arrays based on said region information and the predetermined order of the array,
   (e) accessing a further one of said arrays for said dummy telephone station based on said element selected in step d) and said dummy telephone station identification,
   f) selecting an element from the array accessed in step e) based on a current chronological factor and the predetermined order of the array, and
   g) using the element selected in step f) to identify the selected termination.

2. A method as recited in claim 1 in which said step b) includes:
   b1) translating said region information to identify plural zones of origin for said call based on plural criteria,
   said step c) includes:
   c1) determining from said record for said dummy telephone station a geographic criterion, and
   said step d) includes:
   d1) using that data from the translation of step b1) corresponding to the criterion determined in step c1) to access said array of step d) to select an element from said array.

3. A method as recited in claim 2 wherein said region information is Number Plan Area (NPA) and exchange identification (NXX) and wherein said step b1) includes translating said NPA-NXX information into at least Number Plan Area NPA, Local Transport Area (LATA), Originating Geographic Zone (consisting of the intersection of NPA and LATA), State and Time Zone subscripts.

4. A method as recited in claim 2 wherein said region information is an OOY code and wherein said step b1) includes translating said OOY code into at least Number Plan Area (NPA), Local Transport Area (LATA), Originating Geographic Zone (consisting of the intersection of NPA and LATA), State and Time Zone subscripts.

5. A method as recited in claim 2 in which said further one of said arrays comprises a time band array and wherein said method comprises the further steps of:
   e1) storing in said time band array time data correlating termination identifications and time criteria, and
   f1) accessing said time data with current time parameters to select a termination identification.

6. A method as recited in claim 2 in which said further one of said arrays comprises a day band array and wherein said method comprises the further steps of:
   e1) storing in said day band array data correlating termination identifications and day of week, and
   f1) accessing said day band array with current day of week to select a termination identification.

7. A method as recited in any of claims 1 to 6 wherein said record of step a) comprises, in addition to said hierarchy of arrays, a table of terminations accessed by a pointer, and wherein said array element selected in step f) comprises said pointer.

8. A method as recited in any of claims 1-6 which includes the further step of modifying said dummy telephone station identification by said modification parameter for use as a key in accessing said data base.

9. A method as recited in any of claims 1-6 which includes the further steps of:
   i) determining, at a predetermined point in a seven day period, whether a holiday is located either in the preceding or following seven day period,
   ii) in the event there is a holiday in either seven day period, determining the identification of a customer whose call processing is affected by the holiday, and
   iii) rewriting the record for the customer to change the contents of the customer record to account for the holiday.

10. A method as recited in claim 9 wherein the hierarchy of arrays includes a day band array and wherein said step iii) includes rewriting said day band array.

11. A method of processing 800 calls to determine a termination for the call based on information respecting the dialed number, region of origin and chronological point of call placement comprising the steps of:
   a) storing a call processing record in a data base for each dialed 800 number, said call processing record comprising a hierarchy of at least three arrays,
   a1) a first array addressed by said dialed 800 number having a plurality of keys for different zones of origin as well as a modification factor,
   a2) a second array addressed by said dialed 800 number and one of the keys of said first array and having a plurality of keys for different chronological point of call placement and a3) a third array addressed by said dialed 800 number and keys selected from said first and second arrays and having termination information,
b) said call processing record optionally including one or more modification subsets of records, each modification subset record including a second and third subset array,
b1) said second subset array addressed by said dialed 800 number as modified by said modification factor and a key selected from said first array and having a plurality of keys for different chronological point of call placement,
b2) said third subset array addressed by said dialed 800 number as modified by said modification factor and keys selected from said first array said second subset array and having termination information,
c) responding to receipt of an 800 request message including said dialed 800 number and region of origin information by
c1) accessing said customer record based on the dialed 800 number to access said first array
c2) selecting a key based on the region of origin information,
c3) determining whether the modification factor is non-zero, if the modification factor is zero accessing said second and third arrays to locate termination information, if the modification factor is non-zero, modifying the dialed 800 number by the modification factor and accessing the second and third subset arrays to locate termination information.

12. A method as recited in claim 11 wherein said step c1) includes:
c11) translating said region of origin information into zone of origin subscripts based on a plurality of different criteria to produce a plurality of zone of origin subscripts,
where said first array includes information for selecting a particular zone of origin subscript, and
said step c2) includes using the information of said first array for selecting a particular zone of origin subscript to select one of the plurality of zone of origin subscripts with which to select the key from the first array.

13. A method as recited in claim 12 wherein said region information is Number Plan Area (NPA) and exchange identification (NXX) and wherein said step c11) includes translating said NPA-NXX information into at least Number Plan Area NPA, Local Transport Area (LATA), Originating Geographic Zone (consisting of the intersection of NPA and LATA), State and Time Zone subscripts.

14. A method as recited in claim 12 wherein said region information is an OOY code and wherein said step c11) includes translating said OOY code into at least Number Plan Area (NPA), Local Transport Area (LATA), Originating Geographic Zone (consisting of the intersection of NPA and LATA), State and Time Zone subscripts.

15. A method as recited in claim 11 wherein said second array of said call processing record includes a first and second sub-array, said first sub-array addressed as recited in step a2) and having keys selected based on day of week, said second sub-array addressed by said dialed 800 number and keys from said first array and said first sub-array and having keys selected based on time of day.

16. A method as recited in claim 15 wherein said second subset array of said call processing record includes a first and second subset sub-arrays, said first subset sub-array addressed as recited in step b1) and having keys selected based on day of week, said second subset sub-array addressed by said dialed 800 number as modified by said modification factor and keys from said first array and said first subset sub-array and having keys selected based on time of day.

17. A method as recited in any of claims 11-16 wherein said termination information of said third array has the form of one or more pointers, said call processing record further including a termination table and said step c3) includes selecting a pointer from said third array and selecting termination information from said termination table with said pointer.

18. A method as recited in any of claims 11-16 wherein said termination information of said third array and said third subset array has the form of one or more pointers, said call processing record further including a termination table, said step c3) includes selecting a pointer from said third array or said third subset array depending on whether said modification factor is zero or non-zero and selecting termination information from said termination table with said pointer.

19. A method as recited in any of claims 11-16 which includes the further steps of:
i) determining, at a predetermined point in a seven day period, whether a holiday is located either in the preceding or following seven day period,
ii) in the event there is a holiday in either seven day period, determining the identification of a customer whose call processing is affected by the holiday, and
iii) rewriting the record for the customer to change the contents of the customer record to account for the holiday.

20. A method of processing 800 calls to select a termination for an 800 call based on a dialed 800 number, a region of origin of the call and a chronological point of call placement, the method comprising the steps of:
a) storing in a data base a head entry and a plurality of arrays for each dialed 800 number,
a1) said head entry including a modification factor and a plurality of keys for selection based on region of origin information,
a2) said arrays including a first set of arrays addressed in part by a dialed 800 number and a second set of arrays addressed by a dialed 800 number as modified by a non-zero modification factor,
a3) said first and second set of arrays having keys for selection based on chronological point of call placement,
b) responding to call placement by accessing said head entry for determining whether or not said modification factor is zero,
b1) if said modification factor is zero then 21 accessing said first set of arrays by said dialed 800 number, or
b2) if said modification factor is non-zero then accessing said second set of arrays by said dialed 800 number as modified by the non-zero modification factor,
c) selecting a termination based on information extracted from said head entry and one or more of said arrays.

21. A method as recited in claim 20 wherein:

said step b) further includes selecting a key based on region of origin information, said step b1) includes accessing said first set of arrays by said dialed 800 number and the key selected from said head entry, and said step b2) includes accessing said second set of arrays by said dialed 800 number as modified by the non-zero modification factor and the key selected from said head entry.

22. A method as recited in claim 20 wherein said head entry includes information for selecting a particular zone of origin subscript and which method further includes:

i) translating said region of origin information into zone of origin subscripts based on a plurality of different criteria to produce a plurality of zone of origin subscripts, ii) using the information of the head entry for selecting a particular zone of origin subscript to select one of the plurality of zone of origin subscripts with which to select the key from the head entry.

23. A method as recited in claim 22 wherein said region information is Number Plan Area (NPA) and exchange identification (NXX) and wherein said step i) includes translating said NPA-NXX information into at least Number Plan Area (NPA), Local Transport Area (LATA), Originating Geographic Zone (consisting of the intersection of NPA and LATA), State and Time Zone subscripts.

24. A method as recited in claim 22 wherein said region information is an OOY code and wherein said step i) includes translating said OOY code into at least Number Plan Area (NPA), Local Transport Area (LATA), Originating Geographic Zone (consisting of the intersection of NPA and LATA), State and Time Zone subscripts.

25. A method as recited in claim 20 wherein said first set of arrays comprises:

a21) a plurality of day band arrays accessed by the dialed 800 number and a key selected from said head entry, and a22) a plurality of time band arrays accessed by the dialed 800 number, a key selected from said head entry and a key selected from a day band array, and wherein said second set of arrays comprises:

a31) a plurality of alternate day band arrays accessed by the dialed 800 number as modified by a non-zero modification factor and a key selected from said head entry, and a32) a plurality of alternate time band arrays accessed by the dialed 800 number as modified by a non-zero modification factor, a key selected from said head entry and a key selected from an alternate day band array.

26. A method as recited in claim 20 wherein said arrays further include a third set of termination arrays accessed either by said dialed 800 number, a key selected from said head entry and a key selected from said first set of arrays or by said dialed 800 number as modified by a non-zero modification factor, a key selected from said head entry and a key selected from said second set of arrays.

27. A method as recited in claim 26 wherein said termination arrays include termination identifications.

28. A method as recited in claim 26 wherein said termination arrays include termination pointers, wherein said data base includes a termination table for a dialed 800 number and having a plurality of termination identifications, and wherein said method includes selecting a termination identification from said termination table by use of a pointer selected from a termination array.

29. A method as recited in claim 20 which includes the further steps of:

i) determining, at a predetermined point in a seven day period, whether a holiday is located either in the preceding or following seven day period, ii) in the event there is a holiday in either seven day period, determining the identification of a customer whose call processing is affected by the holiday, and iii) rewriting the record for the customer to change the contents of the customer record to account for the holiday.

* * * * *